United States Patent
Tsujino et al.

(10) Patent No.: US 10,787,168 B2
(45) Date of Patent: Sep. 29, 2020

(54) AUTOMATED PARKING DEVICE AND AUTOMATED PARKING METHOD

(71) Applicant: HONDA MOTOR CO., LTD., Minato-ku, Tokyo (JP)

(72) Inventors: Miki Tsujino, Wako (JP); Masashi Yoshifuku, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/561,861

(22) Filed: Sep. 5, 2019

(65) Prior Publication Data
US 2020/0079360 A1   Mar. 12, 2020

(30) Foreign Application Priority Data

Sep. 7, 2018  (JP) .................. 2018-167455

(51) Int. Cl.
*B60W 30/06*   (2006.01)
*B60W 40/02*   (2006.01)
*B60W 40/08*   (2012.01)

(52) U.S. Cl.
CPC ............ *B60W 30/06* (2013.01); *B60W 40/02* (2013.01); *B60W 40/08* (2013.01); *B60W 2040/0881* (2013.01)

(58) Field of Classification Search
None
See application file for complete search history.

(56) References Cited

U.S. PATENT DOCUMENTS

| | | | | |
|---|---|---|---|---|
| 8,868,329 B2* | 10/2014 | Ikeda | ................ | B60R 1/00 701/400 |
| 9,846,430 B2* | 12/2017 | Hiei | ................ | B60Q 9/00 |
| 9,946,255 B2* | 4/2018 | Matters | ................ | G05D 1/0016 |
| 2003/0004613 A1* | 1/2003 | Hahn | ................ | B62D 15/0285 701/1 |
| 2015/0203111 A1* | 7/2015 | Bonnet | ................ | B62D 15/027 701/25 |
| 2018/0229719 A1* | 8/2018 | Izumi | ................ | G08G 1/127 |

FOREIGN PATENT DOCUMENTS

| | | |
|---|---|---|
| JP | 2009-190560 A | 8/2009 |
| JP | 2009-202610 A | 9/2009 |
| JP | 2011-230549 A | 11/2011 |
| JP | 2017-114289 A | 6/2017 |

OTHER PUBLICATIONS

Office Action dated Mar. 24, 2020 issued over the corresponding Japanese Patent Application No. 2018-167455 with the English translation thereof.

* cited by examiner

*Primary Examiner* — John F Mortell
(74) *Attorney, Agent, or Firm* — Carrier Blackman & Associates, P.C.; Joseph P. Carrier; William D. Blackman

(57) ABSTRACT

An automated parking device is provided with a disembarking guidance unit. In the case that an obstruction is determined to exist in the vicinity of a parking capable frame in accordance with a parking initiation instruction, then before a host vehicle enters the parking capable frame by an automated parking operation performed by a vehicle control unit, the disembarking guidance unit provides guidance to prompt vehicle occupants to disembark at a disembarking position that is based on an adjusted parking position, the positions of the vehicle occupants, and the position of the obstruction.

11 Claims, 7 Drawing Sheets

AUTOMATED PARKING DEVICE AND AUTOMATED PARKING METHOD

CROSS-REFERENCE TO RELATED APPLICATION

This application is based upon and claims the benefit of priority from Japanese Patent Application No. 2018-167455 filed on Sep. 7, 2018, the contents of which are incorporated herein by reference.

BACKGROUND OF THE INVENTION

Field of the Invention

The present invention relates to an automated parking device and an automated parking method which detect a parking capable frame around the periphery of a host vehicle, and cause the host vehicle to be automatically parked within the parking capable frame.

Description of the Related Art

In Japanese Laid-Open Patent Publication No. 2009-202610 (hereinafter referred to as JPA2009-202610), a technique is disclosed that addresses a problem in which, although a vehicle is fitted within a parking frame at the completion of parking, insufficient space is left available for opening and closing the doors of the vehicle due to another vehicle that is already parked in an adjacent parking frame, thus making it impossible to board and exit from the vehicle.

In accordance with such a technique, in the case of a surrounding condition in which there is a wall on the passenger seat side when the host vehicle is parked in the parking frame, a position that is close to the side of the wall is chosen as the parking position when the only occupant of the vehicle is the driver (see FIG. 5 of JPA2009-202610), whereas in the case that a vehicle occupant is on the passenger seat side, a position where the longitudinal axis of the host vehicle is aligned with a center line between a side portion of the other vehicle and the wall is chosen as the parking position (see FIG. 6 and paragraph [0031] of JPA2009-202610).

However, in the case that a vehicle occupant is on the passenger seat side, even if a position where the longitudinal axis of the host vehicle is aligned with a center line between a side portion of the other vehicle and the wall is chosen as the parking position, there is a problem in that disembarking of the vehicle occupant is extremely sensitive, and it remains difficult for the vehicle occupant to disembark.

SUMMARY OF THE INVENTION

The present invention has been devised taking into consideration the aforementioned problems, and has the object of providing an automated parking device and an automated parking method which, even if an obstruction exists within a parking capable frame, make it possible for the vehicle occupants to easily disembark.

One aspect of the present invention is an automated parking device that detects a parking capable frame around a periphery of a host vehicle, and causes the host vehicle to be automatically parked in the detected parking capable frame, the automated parking device comprising: a vehicle occupant detection unit configured to detect positions of vehicle occupants inside the host vehicle; an obstruction detection unit configured to detect an obstruction around the periphery of the host vehicle; a parking position adjustment unit configured to adjust a parking position within the parking capable frame, in accordance with a position of the obstruction existing in a vicinity of the parking capable frame; a parking initiation instruction unit configured to issue an instruction to the host vehicle to initiate an automated parking operation in accordance with a predetermined operation; a vehicle control unit configured to control the host vehicle so as to park in the adjusted parking position in accordance with the parking initiation instruction; and a disembarking guidance unit, wherein, in a case that the obstruction is determined to exist in the vicinity of the parking capable frame in accordance with the parking initiation instruction, then before the host vehicle enters the parking capable frame by the automated parking operation performed by the vehicle control unit, the disembarking guidance unit provides guidance to prompt the vehicle occupants to disembark at a disembarking position that is based on the adjusted parking position, the positions of the vehicle occupants, and the position of the obstruction.

Another aspect of the present invention is an automated parking method for detecting a parking capable frame around a periphery of a host vehicle, and causing the host vehicle to be automatically parked in the detected parking capable frame, the automated parking method comprising: a vehicle occupant detection step of detecting positions of vehicle occupants inside the host vehicle; an obstruction detection step of detecting an obstruction around the periphery of the host vehicle; a parking position adjustment step of adjusting a parking position within the parking capable frame, in accordance with a position of the obstruction existing in a vicinity of the parking capable frame; a parking initiation instruction step of issuing an instruction to the host vehicle to initiate an automated parking operation in accordance with a predetermined operation; a vehicle control step of controlling the host vehicle so as to park in the adjusted parking position in accordance with the parking initiation instruction; and a disembarking guidance step, wherein, in the disembarking guidance step, in a case that the obstruction is determined to exist in the vicinity of the parking capable frame in accordance with the parking initiation instruction, then before the host vehicle enters the parking capable frame by the automated parking operation performed in the vehicle control step, guidance is provided to prompt the vehicle occupants to disembark at a disembarking position that is based on the adjusted parking position, the positions of the vehicle occupants, and the position of the obstruction.

In accordance with the present invention, during execution of the automated parking operation, in the case that an obstruction exists in the vicinity of the parking capable frame, then before the host vehicle enters the parking capable frame, guidance (disembarking guidance) is provided to the vehicle occupants in order to prompt them to disembark at the disembarking position where disembarking is possible in consideration of the obstruction and the positions of the vehicle occupants. For this reason, prior to completion of parking in the parking capable frame, a proposal (notification) is issued to the vehicle occupants, so that they may disembark from the vehicle under an environment (disembarking position) where disembarking is easy without having to worry about the obstruction. As a result, even if the obstruction exists within a parking capable frame, the vehicle occupants can easily disembark.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Preferred embodiments of an automated parking device and an automated parking method according to the present invention will be presented and described in detail below with reference to the accompanying drawings.

[Embodiments]
[Configuration]

Figure 1:
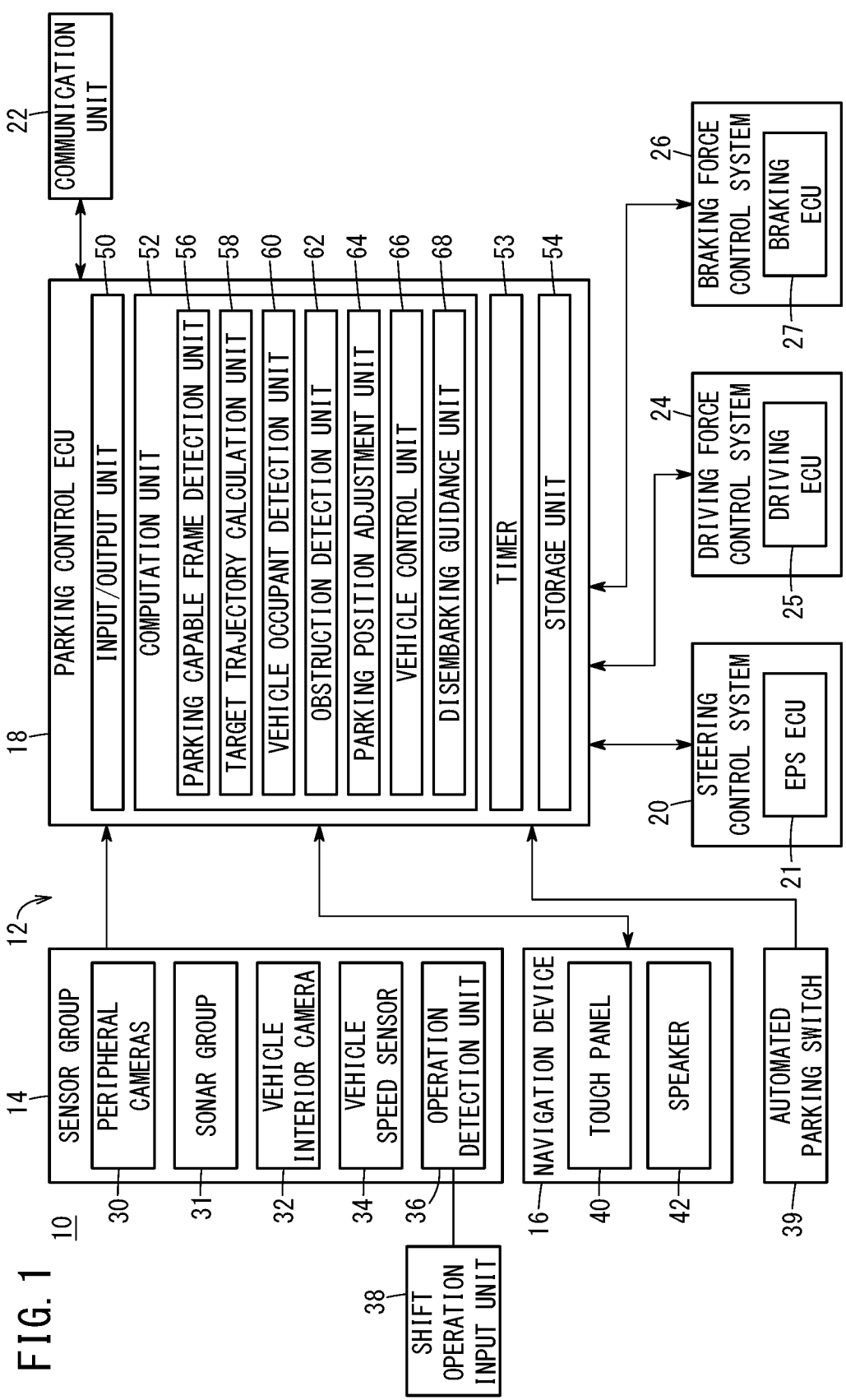
FIG. 1 is a block diagram showing a configuration of a host vehicle to which there is applied an automated parking device according to an embodiment for carrying out an automated parking method according to the embodiment.

FIG. 1 is a block diagram showing a configuration of a vehicle (host vehicle) 10 to which there is applied an automated parking device 12 according to an embodiment for carrying out an automated parking method according to the embodiment.

As shown in FIG. 1, the automated parking device 12 includes a sensor group 14, a navigation device 16, a parking control ECU (parking control electronic control device) 18, a steering control system 20, a communication unit 22, a driving force control system 24, a braking force control system 26, a shift operation input unit 38, and an automated parking switch 39.

The sensor group 14 acquires various detection values used in connection with the parking control. In the sensor group 14, there are included peripheral cameras (including a front camera, a rear camera, a left side camera, and a right side camera) 30, a sonar group {including a front sonar group (four individual sonars including a left diagonal front sonar, a front left side sonar, a front right side sonar, and a right diagonal front sonar), a rear sonar group (four individual sonars including a left diagonal rear sonar, a rear left side sonar, a rear right side sonar, and a right diagonal rear sonar), a left side sonar group (two individual sonars including a left side front sonar and a left side rear sonar), and a right side sonar group (two individual sonars including a right side front sonar and a right side rear sonar)} 31, a vehicle interior camera 32, a vehicle speed sensor 34, and an operation detection unit 36.

The peripheral cameras 30 output, to the parking control ECU 18, signals of peripheral images {a front image, a rear image, and side images (a left side image and a right side image)} obtained by capturing images around the periphery (the front, rear, and sides) of the host vehicle 10.

The sonar group 31 outputs, to the parking control ECU 18, signals of sonar images {a front sonar image, a rear sonar image, and side sonar images (a left side sonar image and a right side sonar image)} in which objects around the periphery (the front, rear, and sides) of the host vehicle 10 are captured by transmitting sound waves around the periphery, together with receiving reflected sound waves from the peripheral objects.

The vehicle interior camera 32 outputs seating image signals of all of vehicle occupants including a driver to the parking control ECU 18.

The vehicle speed sensor 34 detects the speed of the host vehicle 10, or stated otherwise, a vehicle speed V, and outputs the detected vehicle speed V to the parking control ECU 18. The vehicle speed sensor 34 can be replaced by wheel speed sensors.

The operation detection unit 36 detects the content of operations performed by a user (driver) using the shift operation input unit 38, and outputs, to the parking control ECU 18, the shift positions (a park position P, a reverse position R, a neutral position N, a forward position D, and a low gear position L) which make up the detected operation content.

Moreover, the shift operation input unit 38 is constituted by a so-called shift-by-wire technology, thus making it possible for an automated shifting operation to be carried out by the parking control ECU 18.

The navigation device 16 detects the current position of the vehicle 10 using, for example, a GPS, and creates a route to the destination to guide the user. The navigation device 16 includes a storage device equipped with a map information database.

A touch panel 40 and a speaker 42 are provided in the navigation device 16.

The touch panel 40 is capable of functioning as an input device as well as a display device (display unit) of the automated parking device 12. A screen regarding the parking control can be displayed on the touch panel 40. Moreover, constituent elements other than the touch panel 40 may be used as the input device or the display device. Further, when the parking control takes place, voice guidance can be performed via the speaker 42.

The automated parking switch (parking initiation instruction unit) 39 outputs, to the parking control ECU 18, an automated parking initiation signal (parking initiation signal) to cause the automated parking operation of the host vehicle 10 to be initiated in response to a pressing operation made by the user. The automated parking switch 39 is disposed, for example, at a position on the dashboard where the driver is capable of operating the automated parking switch 39.

Moreover, instead of operating the automated parking switch 39, the driver may output the automated parking initiation signal to initiate the automated parking operation via the touch panel 40. In this case, the touch panel 40 can input and output commands in relation to the parking control.

The parking control ECU 18 includes an input/output unit 50, a computation unit 52, a timer (timekeeping device) 53, and a storage unit 54. The computation unit 52 can be configured, for example, by a CPU. The computation unit 52 executes the parking control by controlling each of the respective units based on programs stored in the storage unit 54.

The computation unit 52 is equipped with a parking capable frame detection unit 56, a target trajectory calculation unit 58, a vehicle occupant detection unit 60, an obstruction detection unit 62, a parking position adjustment unit 64, a vehicle control unit 66, and a disembarking guidance unit 68, which are realized by programs that are stored in the storage unit 54 being executed by the computation unit 52.

The parking capable frame detection unit 56 detects a parking capable frame around the periphery of the host vehicle, on the basis of the peripheral image signals output from the peripheral cameras 30, and the sonar image signals output from the sonar group 31.

The target trajectory calculation unit 58 calculates a target trajectory from the host vehicle position until entry into the parking capable frame, based on the detected parking capable frame, the positions of the obstructions, the host vehicle position, and the vehicle model of the host vehicle 10.

The vehicle occupant detection unit 60 detects the positions of the vehicle occupants inside the host vehicle 10 (for example, a driver in the driver's seat, vehicle occupants in the passenger seat, the rear seats, etc.) based on seating image signals of all of the vehicle occupants including the driver output from the vehicle interior camera 32. The positions of the vehicle occupants can also be detected by seat sensors provided in the respective seats.

The obstruction detection unit 62 detects obstructions (including an obstruction inside the parking capable frame) around the periphery of the host vehicle 10, on the basis of the peripheral image signals output from the peripheral cameras 30, and the sonar image signals output from the sonar group 31.

Although in principal, the parking position adjustment unit 64 adjusts the center of the parking capable frame to the parking position (in the case that the parking capable frame is a rectangle, the center of a rectangle circumscribing the host vehicle 10 is made to coincide with the center of the rectangle, and respective sides of the circumscribing rectangle are adjusted so as to be in parallel with the respective sides of the rectangle), in practice, the parking position adjustment unit 64 adjusts (moves to the left, moves to the right, etc.) the parking position of the host vehicle 10 inside the parking capable frame depending on the position of the obstruction existing in the vicinity (on an inner side and an outer side) of the parking capable frame.

Moreover, in the case that the parking position is changed from the center and adjusted, the target trajectory calculation unit 58 recalculates the target trajectory.

In response to the automated parking initiation signal output from the automated parking switch 39, the vehicle control unit 66 cooperatively controls the steering control system 20, the driving force control system 24, and the braking force control system 26, and following along the target trajectory, controls the host vehicle 10 so as to park in the parking position that has been adjusted (automated parking control).

In principle, when the host vehicle 10 is parked in the adjusted parking position within the parking capable frame, the disembarking guidance unit 68 provides voice guidance in the interior of the vehicle, for example, a phrase such as "please disembark" through the speaker 42.

The steering control system 20 is constituted by a steering wheel which is also capable of being operated by the driver, vehicle wheels, and an electric power steering (EPS) device that steers the vehicle wheels in accordance with steering of the steering wheel, and includes an EPS ECU 21. By means of so-called steer-by-wire technology, the EPS ECU 21 makes it possible to automatically steer the vehicle wheels at target steering angles at each of respective vehicle positions on the target trajectory.

The driving force control system 24 includes an engine serving as a driving source, a motor, and a transmission, etc., and a driving ECU 25. The driving ECU 25 drives the engine and the motor by so-called driving force-by-wire technology together with controlling the transmission, and by applying the driving force to the vehicle wheels through the transmission, makes it possible to automatically cause the host vehicle 10 to undergo forward movement or be moved in reverse. An accelerator pedal and the shift operation input unit 38 are also configured to allow manual operation thereof by the driver.

The braking force control system 26 includes an electric servo brake serving as a braking source and a braking ECU 27. The braking ECU 27 is capable of automatically applying a braking force to the vehicle wheels by so-called brake-by-wire technology, and thereby causes the vehicle 10 to stop. A brake pedal is also configured to allow manual operation thereof by the driver.

The communication unit (wireless communication unit) 22 communicates, for example, with a management system inside the parking lot, and obtains position information of the parking capable frames (vacant parking frames) existing within the parking lot from the management system.

[Operations]

Figure 2:
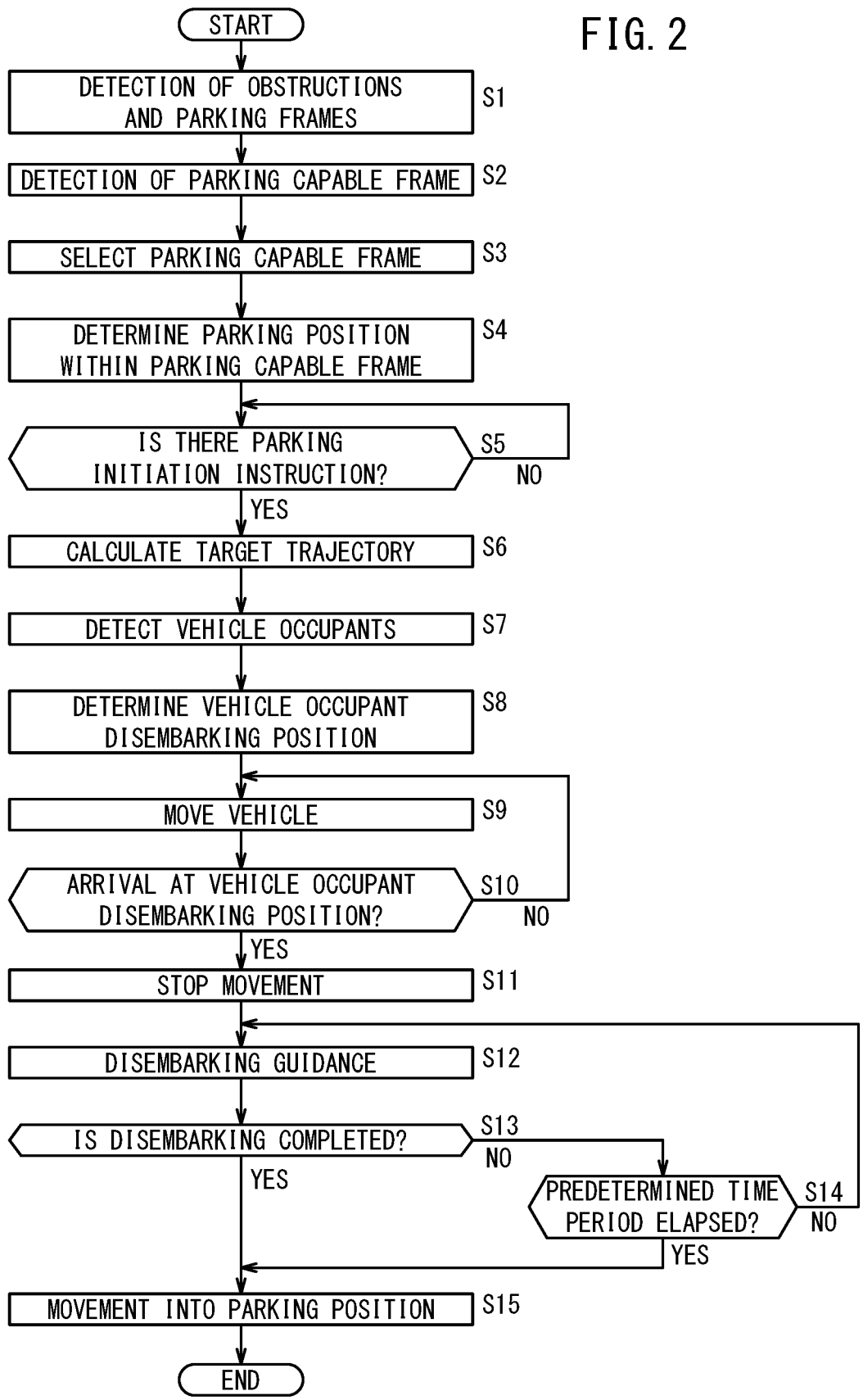
FIG. 2 is a flowchart provided to describe operations of the automated parking device shown in FIG. 1.

The vehicle 10 to which the automated parking device 12 according to the present embodiment is applied is basically configured in the manner described above. Next, a description will be given with reference to the flowchart shown in FIG. 2 concerning operations of the automated parking device 12.

Figure 3:
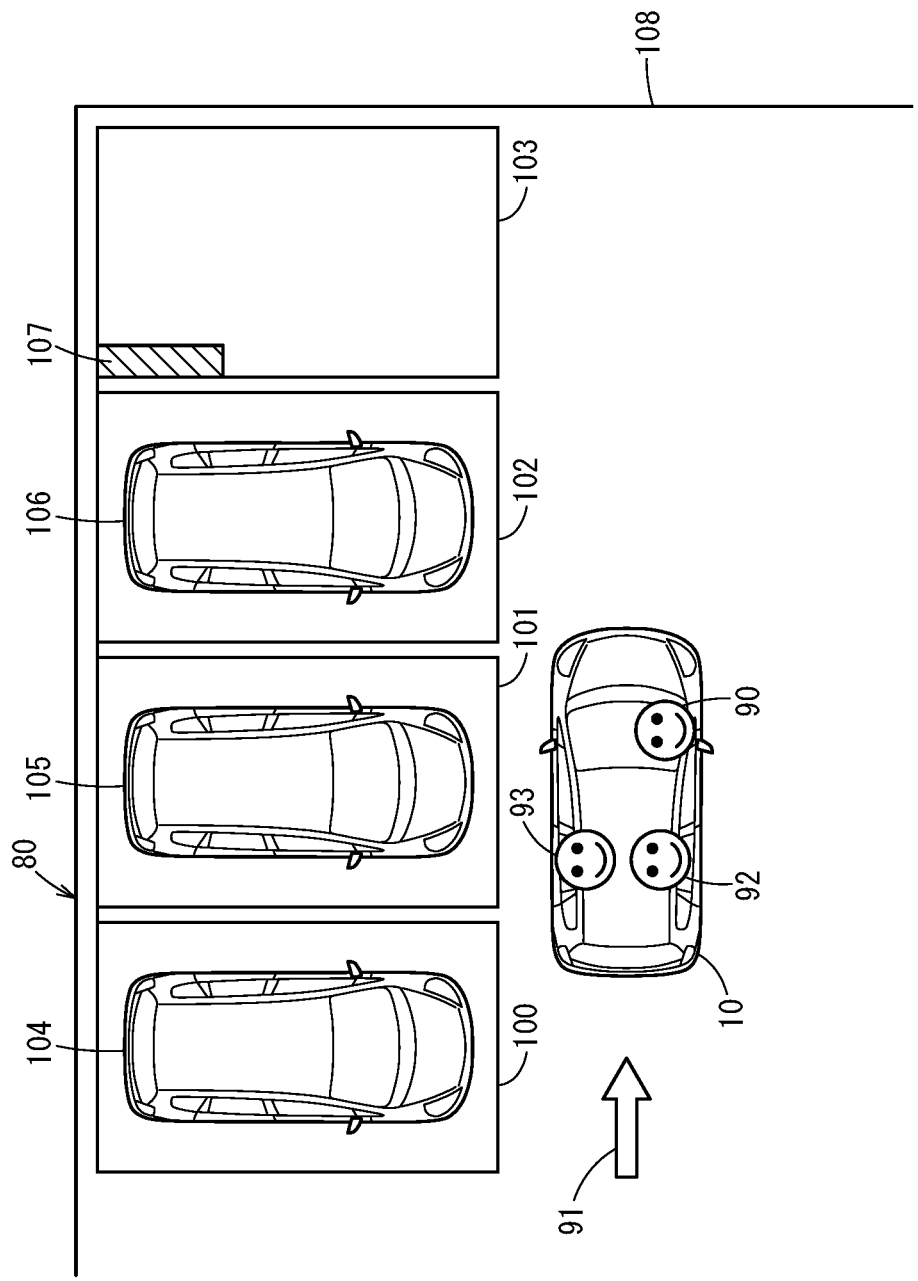
FIG. 3 is a schematic diagram, as viewed in plan, of the host vehicle and a portion of a parking lot in which the host vehicle is attempting to park.

FIG. 3 is a schematic diagram, as viewed in plan, of the host vehicle 10 and a portion of a parking lot 80 in which the host vehicle 10 is attempting to park.

When the host vehicle 10 enters the parking lot 80 by a manual operation performed by a vehicle occupant (driver) 90 prior to initiation of the automated parking operation, in step S1, the vehicle travels in the direction of an arrow 91, and during traveling thereof, parking frames 100, 101, 102, and 103 (100 to 103) are detected by the obstruction detection unit 62 and the parking capable frame detection unit 56, and obstructions 104, 105, 106, 107, 108 (104 to 108) are detected, based on the peripheral image signals output from the peripheral cameras 30, and the sonar image signals output from the sonar group 31.

The obstructions 104 to 108 are grasped by a comparison determination of the similarity thereof with obstruction models stored in the storage unit 54.

In this case, the obstructions 104 to 106 are grasped as other vehicles parked in the parking frames 100 to 102, the obstruction 107 is grasped as a structure within the parking frame 103, and the obstruction 108 is grasped as a wall.

In step S2, the parking frame 103 is detected by the parking capable frame detection unit 56 as being a parking capable frame (the reference numeral therefor is the same as that of the parking frame 103).

The parking capable frame 103 is displayed on the touch panel (which is used in a dual manner as a display device) 40 of the navigation device 16.

It is assumed that, after the host vehicle 10 has been driven forward by the vehicle occupant (driver) 90 to a position close to the edge of the obstruction 108 on the front side (close to the edge of the wall) and the parking frames 100 to 103 and the obstructions 104 to 108 are detected (the positions thereof are detected), the host vehicle 10 is moved in reverse to the position shown in FIG. 3 and stopped.

At the stopped position, when the driver 90 touches the parking capable frame 103 in accordance with the display on the touch panel 40, the parking capable frame 103 is selected as the parking position in step S3.

At this time, in step S4, the parking position adjustment unit 64 determines (adjusts) the parking position within the parking capable frame 103.

In the present example, when the host vehicle 10 is parked in reverse in the parking capable frame 103, the presence of the obstruction 107 on the right rear side of the vehicle occupant (driver) 90 is taken into consideration, and the parking position of the host vehicle 10 is adjusted in a manner so that the vehicle center line is located at a position (offset position) on the left side {a side closer to the obstruction (wall) 108}.

Figure 4:
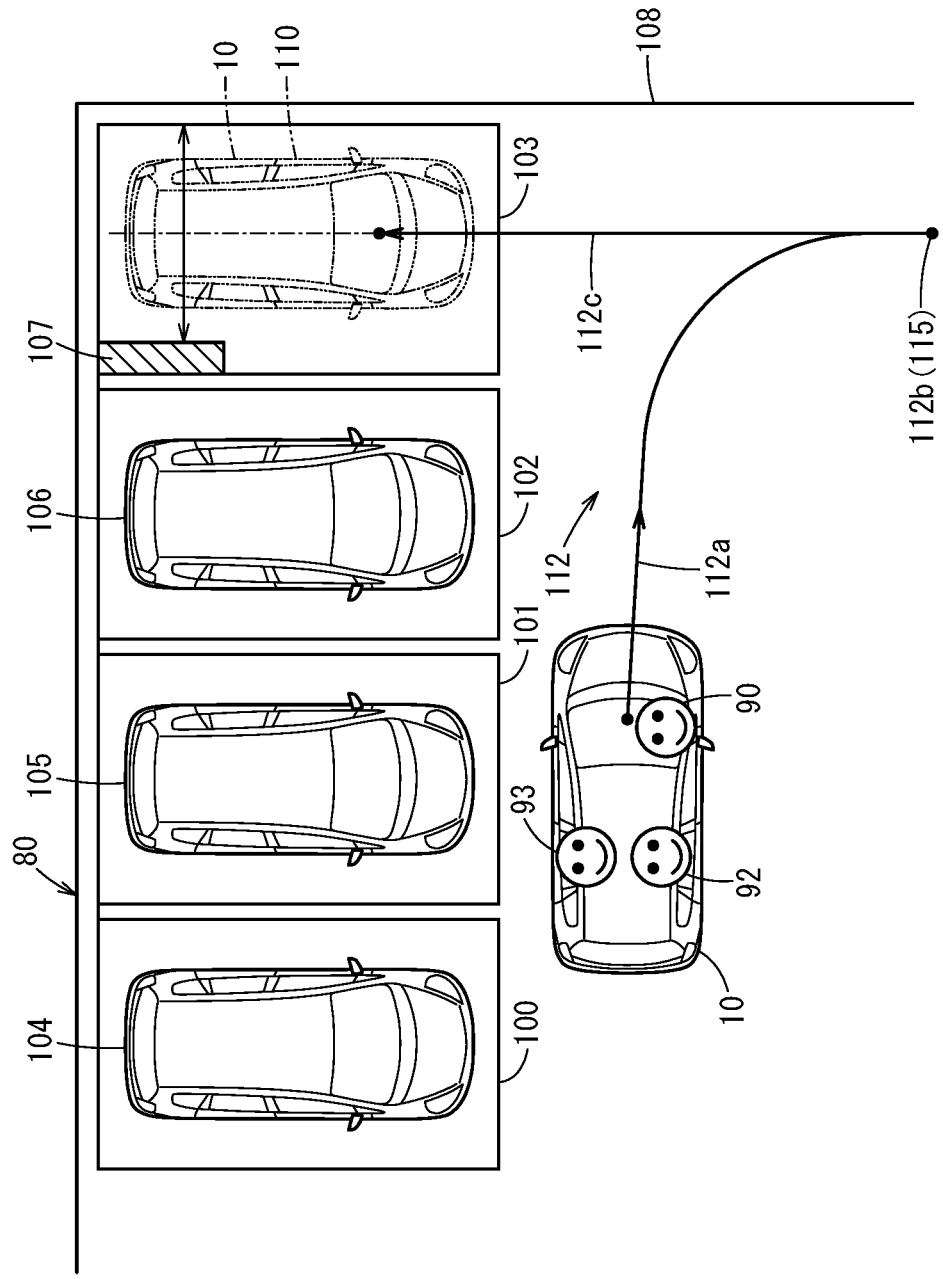
FIG. 4 is a schematic plan view for describing an adjusted parking position and a target trajectory.

In FIG. 4, the adjusted parking position indicated by the two-dot-dashed line (a position at which the center line in the longitudinal direction of the host vehicle 10 indicated by the virtual two-dot-dashed line coincides with a bisecting line between a line of the parking capable frame 103 on the side closer to the edge of the obstruction (wall) 108 and an extension line of a side surface of the obstruction 107 closer to the host vehicle 10) is referred to as a parking position 110.

Next, in step S5, the parking control ECU 18 receives the automated parking initiation signal from the automated parking switch 39 in accordance with a pressing operation made by the user (step S5: YES).

In this case, first, in step S6, a target trajectory 112 of (for example, the center of gravity of) the vehicle 10 from the current stopped position thereof to the adjusted parking position 110 is calculated by the target trajectory calculation unit 58.

In the example shown in FIG. 4, the target trajectory 112 is calculated as including a right steering trajectory (forward traveling) 112a, a turn-about position (turn-about position trajectory) 112b, and a rearward trajectory (traveling in reverse) 112c.

Next, in step S7, the vehicle occupant detection unit 60 detects the positions of the vehicle occupants inside the host vehicle 10 (for example, vehicle occupant seating positions of the driver's seat, the passenger seat, the rear seats, etc.) based on seating image signals of all of the vehicle occupants including the driver 90 output from the vehicle interior camera 32. In the example shown in FIG. 4, the vehicle occupant (driver) 90 in the driver's seat and vehicle occupants 92 and 93 on both sides of the rear seats are detected.

Next, in step S8, after the target trajectory 112 is calculated in accordance with the parking initiation instruction in step S5, the disembarking guidance unit 68 determines whether or not the obstruction 107 exists in the vicinity of the parking capable frame (the adjusted parking position 110). In the case that such an obstruction does not exist, the disembarking guidance unit 68 determines the adjusted parking position 110 to be the disembarking position of the vehicle occupants (the driver 90 and the vehicle occupants 92 and 93).

On the other hand, in step S8, as shown in the example of FIG. 4, in the case that the obstruction 107 exists in the vicinity of the parking capable frame 103, then prior to the host vehicle 10 entering the parking capable frame 103, the disembarking guidance unit 68 determines, in the present embodiment, the turn-about position 112b to be a vehicle occupant disembarking position (disembarking position, midway disembarking position) 115 where the vehicle occupants 92 and 93 are prompted to disembark by the disembarking guidance unit 68, based on the adjusted parking position 110, the positions of the vehicle occupants, and the position of the obstruction 107, while taking into consideration the ease with which the vehicle occupants 92 and 93 can disembark.

Next, in step S9, the vehicle control unit 66 cooperatively controls the steering control system 20, the driving force control system 24, and the braking force control system 26, and initiates the automated parking operation (automated parking movement, automated parking control) following along the target trajectory 112 (112a, 112b, 112c) for the vehicle 10 to move the vehicle 10. During the automated parking operation, in step S10, the disembarking guidance unit 68 determines whether or not the host vehicle 10 has reached the vehicle occupant disembarking position 115, and the automated parking operation of step S9 is carried out until the host vehicle 10 reaches the vehicle occupant disembarking position 115 (step S10: YES).

In step S10, when it is detected by the disembarking guidance unit 68 that the vehicle 10 has reached the vehicle occupant disembarking position 115 (step S10: YES), then in step S11, the disembarking guidance unit 68 makes a request to the vehicle control unit 66 that movement of the vehicle be stopped.

Upon receiving the movement stop request, in step S11, the vehicle control unit 66 stops application of the driving force by the driving force control system 24, places the shift operation input unit 38 in the park position P, and applies automated braking using the braking force control system 26 to thereby stop the vehicle 10.

Figure 5:
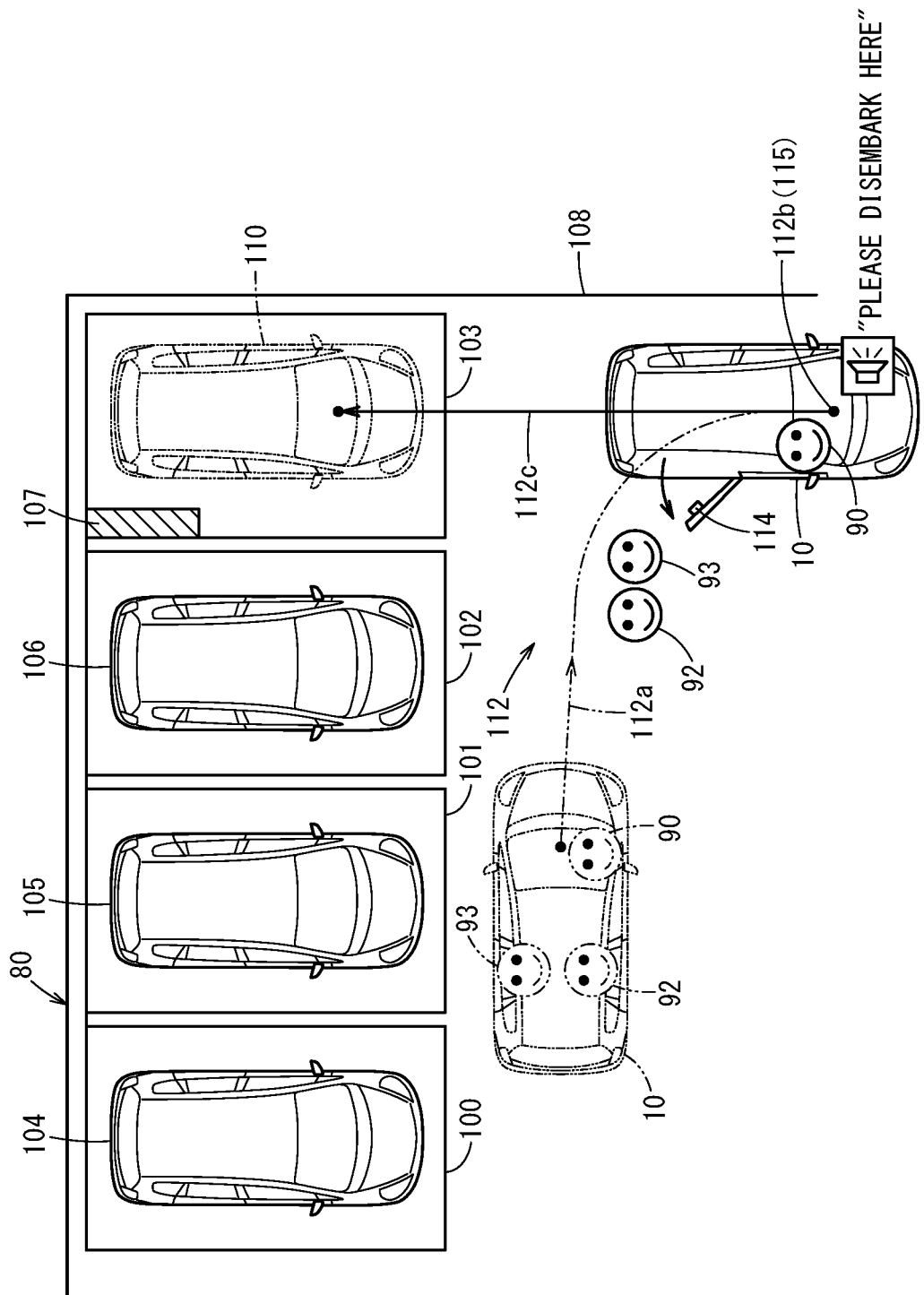
FIG. 5 is a schematic plan view provided to describe operations of a disembarking guidance unit.

Next, giving a description with reference to FIG. 5, in step S12, the disembarking guidance unit 68 provides guidance through the speaker 42 with the phrase "please disembark here" to prompt the vehicle occupants 92 and 93 to disembark. At this time, in accordance with the request from the disembarking guidance unit 68, the vehicle control unit 66 unlocks a door lock 114 of the rear right side door.

In step S13, the vehicle occupant detection unit 60 determines whether disembarking of all of the vehicle occupants 92 and 93 excluding the vehicle occupant (driver) 90 has been completed at the disembarking position 115 as guided by the disembarking guidance unit 68.

In this case, in step S11, a limited time period (predetermined time period) from the start to the end of disembarking from the vehicle is set, and at the time that the disembarking guidance is provided, the timer (disembarking confirmation timer) 53 which counts the limited time period (predetermined time period) begins counting.

If disembarking is completed within the predetermined time period (step S13: YES or step S13: NO→step S14: NO→step S12→step S13: YES), or alternatively, if disembarking is not completed within the predetermined time period (step S13: NO, step S14: YES), the door lock 114 is locked regardless of whether or not all of the vehicle occupants 92 and 93 who are objects intended to disembark have disembarked at the disembarking position 115, and in step S15, the disembarking guidance unit 68 communicates with the vehicle control unit 66 so as to park the host vehicle 10 in the adjusted parking position 110.

Figure 6:
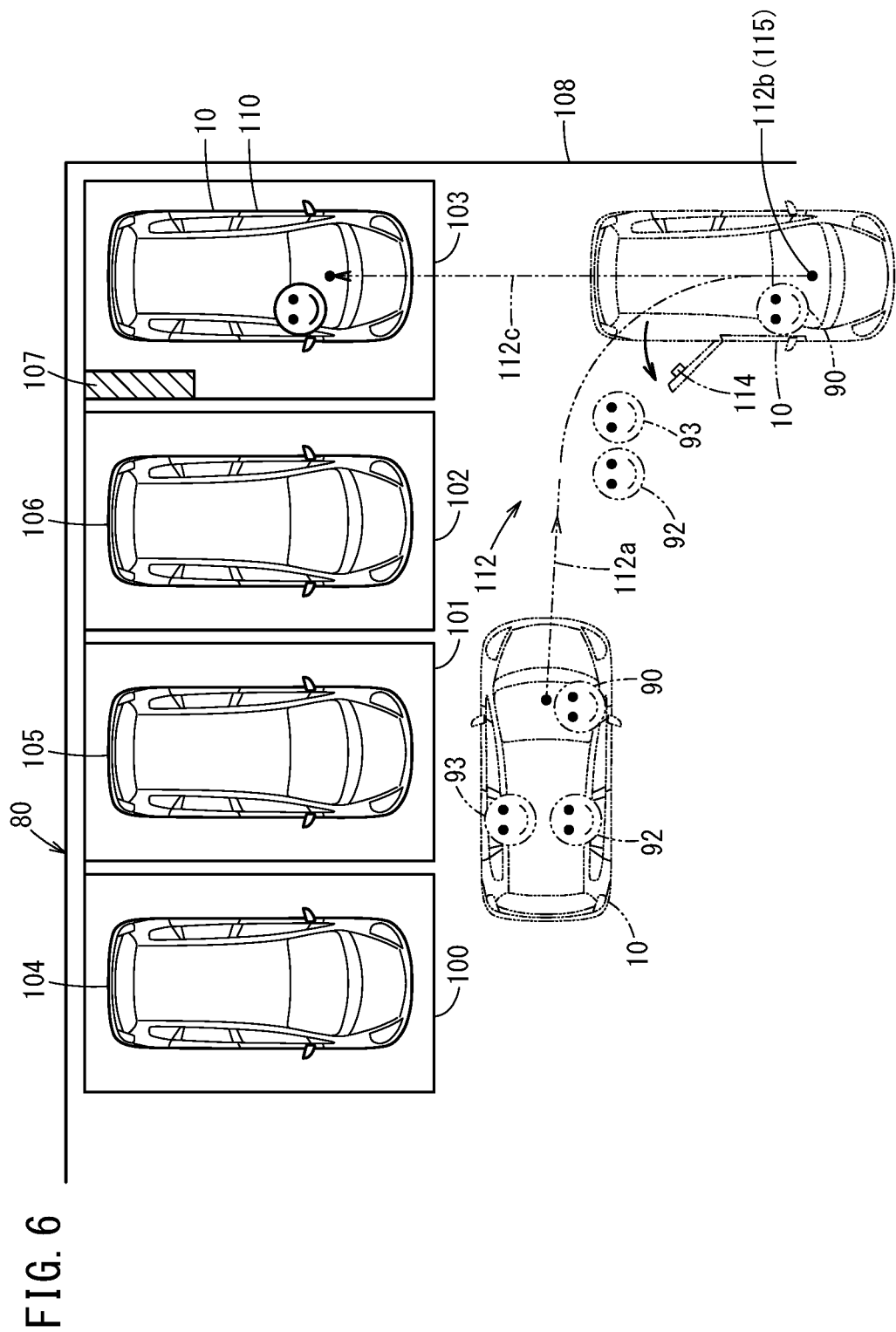
FIG. 6 is a schematic plan view showing a state in which the host vehicle is automatically parked in the adjusted parking position.

In step S15, as shown in FIG. 6, the host vehicle 10 resumes the automated parking operation from the turn-about position 112b by the vehicle control unit 66, and is automatically driven along the rearward trajectory 112c to the adjusted parking position 110.

[Modifications]

The above-described embodiment can be modified in the following manner.

Figure 7:
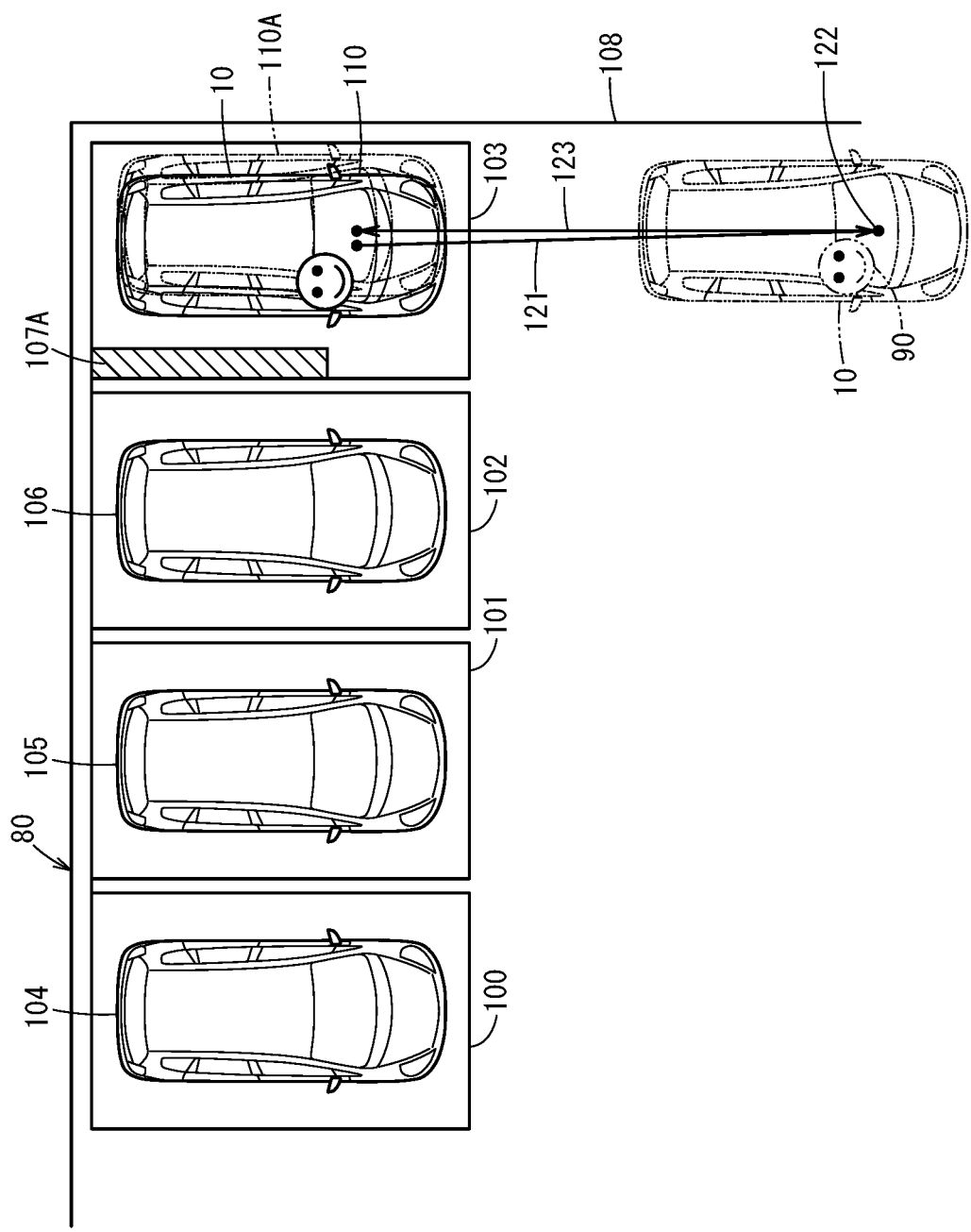
FIG. 7 is a schematic plan view provided to describe an automated parking operation according to a modification.

In the case that the obstruction 107 is an obstruction 107A of a size that extends to the vehicle occupant (driver) 90 seat side as shown in FIG. 7, when parked in the parking position 110, if it is found to be difficult for the vehicle occupant (driver) 90 to open the door and disembark from the vehicle due to the presence of the obstruction 107A, the automated parking switch 39 is pressed again.

In this case, based on the information (signals) from the parking capable frame detection unit 56 and the obstruction detection unit 62, the parking position adjustment unit 64 sets and changes the parking position 110 to another parking position 110A which is moved closer sideways to the edge of the obstruction (wall) 108, as indicated by the two-dot-dashed line.

At this time, when a new trajectory (forward, turn-about, reverse) 121, 122, 123 (121 to 123) is calculated by the target trajectory calculation unit 58, the host vehicle 10 is automatically driven by the vehicle control unit 66 along the new trajectory 121 to 123 to the other adjusted parking position 110A.

At the changed parking position 110A, it becomes easy for the vehicle occupant (driver) 90 to open the door and disembark.

[SUMMARY]

The automated parking device 12 according to the present invention detects the parking capable frame 103 around a periphery of the host vehicle 10, and causes the host vehicle 10 to be automatically parked in the detected parking capable frame 103, the automated parking device 12 comprising: the vehicle occupant detection unit 60 configured to detect the positions of the vehicle occupants 90, 92 and 93 inside the host vehicle 10; the obstruction detection unit 62 configured to detect the obstructions 104 to 108 around the periphery of the host vehicle 10; the parking position adjustment unit 64 configured to adjust the parking position 110 within the parking capable frame 103, in accordance with the position of the obstruction 107 existing in the vicinity of the parking capable frame 103; the parking initiation instruction unit, for example, the automated parking switch 39, configured to issue the instruction to the host vehicle 10 to initiate the automated parking operation in accordance with a predetermined operation; the vehicle control unit 66 configured to control the host vehicle 10 so as to park in the adjusted parking position 110 in accordance with the parking initiation instruction; and the disembarking guidance unit 68, wherein, in the case that the obstruction 107 is determined to exist in the vicinity of the parking capable frame 103 in accordance with the parking initiation instruction, then before the host vehicle 10 enters the parking capable frame 103 by the automated parking operation performed by the vehicle control unit 66, the disembarking guidance unit 68 provides guidance to prompt the vehicle occupants 92 and 93 to disembark at the disembarking position 115 that is based on the adjusted parking position 110, the positions of the vehicle occupants 92 and 93, and the position of the obstruction 107.

In the foregoing manner, during execution of the automated parking operation, in the case that the obstruction 107 exists in the vicinity of the parking capable frame 103, then before the host vehicle 10 enters the parking capable frame 103, guidance (disembarking guidance) is provided to the vehicle occupants 92 and 93 in order to prompt them to disembark at the disembarking position 115 in consideration of the obstruction 107 and the positions of the vehicle occupants 92 and 93. For this reason, prior to completion of parking in the parking capable frame 103, a proposal (notification) is issued to the vehicle occupants 92 and 93, so that they may disembark from the vehicle under an environment (disembarking position 115) where disembarking is easy without having to worry about the obstruction 107. As a result, even if the obstruction 107 exists within the parking capable frame 103, the vehicle occupants 92 and 93 can easily disembark.

In this case, the vehicle occupant detection unit 60 determines completion of disembarking of the vehicle occupants 92 and 93 excluding the vehicle occupant (driver) 90 at the disembarking position 115 that has been guided by the disembarking guidance unit 68, and the vehicle control unit 66 controls the host vehicle 10 so as to park in the adjusted parking position 110 in response to the determination result of the completion of disembarking.

In accordance with this feature, the disembarking action of the vehicle occupants 92 and 93 at the disembarking position 115 before entering the parking capable frame 103 in which the obstruction 107 exists in the vicinity, and the operation of resuming automated parking in the parking capable frame 103 can be smoothly linked together.

Further, in the case that a plurality of the vehicle occupants 92 and 93 are objects intended to disembark at the disembarking position 115, the disembarking guidance unit 68 provides guidance to prompt all the vehicle occupants to disembark at the position where disembarking of all the vehicle occupants is possible.

Therefore, disembarking of the vehicle occupants 92 and 93 and parking of the host vehicle 10 can be carried out more smoothly.

Furthermore, the disembarking guidance unit 68 communicates with the vehicle control unit 66 so as to control the host vehicle 10 to park in the adjusted parking position 110, after a predetermined time period has elapsed from providing the disembarking guidance, regardless of whether or not all the vehicle occupants 92 and 93 who are the objects intended to disembark have disembarked at the disembarking position 115.

In accordance with this feature, even in the case that, among the plurality of vehicle occupants 92 and 93 who are the objects intended to disembark midway during parking in the parking capable frame 103, a vehicle occupant exists who does not wish to disembark at the disembarking position 115, the automated parking operation can be resumed, and therefore it is possible to prevent the occurrence of a situation in which suspension of the automated parking operation for the purpose of disembarking continues any longer than necessary.

Even in the case that all the vehicle occupants 92 and 93 who are the objects intended to disembark have not disembarked at the disembarking position 115, the vehicle control unit 66 resumes the control of the host vehicle 10 so as to park in the adjusted parking position 110 when the parking initiation instruction unit, for example, the automated parking switch 39 is operated again.

In accordance with this feature, even in the case that a vehicle occupant exists who does not wish to disembark, the automated parking operation can be promptly resumed by an operation of the user.

Furthermore, the vehicle control unit 66 causes the host vehicle 10 to stop at the disembarking position 115 where the disembarking guidance is provided by the disembarking guidance unit 68.

In accordance with this feature, while stopped at the disembarking position 115 prior to completion of parking in the parking capable frame 103, the vehicle occupants 92 and 93 are capable of disembarking under an environment (position) where disembarking is easy without having to worry about the obstruction 107.

Furthermore, when operation of the parking initiation instruction is detected again after the disembarking guidance has been provided by the disembarking guidance unit 68, the vehicle control unit 66 resumes the automated parking operation.

In this manner, the automated operation of parking into the adjusted parking position 110 can be promptly resumed after completion of the disembarking guidance.

Furthermore, when the disembarking guidance is provided by the disembarking guidance unit 68, the vehicle control unit 66 unlocks a predetermined door so as to enable the vehicle occupants 92 and 93 to disembark at the disembarking position 115.

Therefore, the vehicle occupants 92 and 93 can more smoothly disembark at the disembarking position 115.

Furthermore, in the case that the vehicle occupant (driver) 90 has difficulty in disembarking due to the presence of the obstruction 107A when parked at the adjusted parking position 110, then when operation of the parking initiation instruction unit, for example, the automated parking switch 39, is detected again, the vehicle control unit 66 sets, through the parking position adjustment unit 64, another parking position 110A within the parking capable frame 103 where the vehicle occupant (driver) 90 is allowed to easily disembark, and control the host vehicle 10 so as to park in the other parking position 110A.

Therefore, even in the case that the vehicle occupant (driver) 90 has difficulty in disembarking after having moved into the parking position 110, the vehicle 10 is caused to move again and parked at the parking position that is changed to the other parking position 110A within the parking capable frame 103 where disembarking of the vehicle occupant (driver) 90 is possible, and thus it becomes easy for the vehicle occupant (driver) 90 to disembark.

In the automated parking device 12, in the case of parking in reverse, the guidance to prompt all the vehicle occupants 92 and 93 to disembark at the disembarking position 115 where disembarking of all the vehicle occupants 92 and 93 is possible is provided at a position where the host vehicle 10 performs turnabout from forward traveling to traveling in reverse.

In this case, since the host vehicle 10 stops temporarily at the position where the host vehicle 10 performs turnabout, it is convenient for the vehicle occupants to disembark, and there is no need to stop at a different position in order to disembark.

The automated parking method according to the present invention detects the parking capable frame 103 around a periphery of the host vehicle 10, and causes the host vehicle 10 to be automatically parked in the detected parking capable frame 103, the automated parking method comprising: the vehicle occupant detection step (step S7) of detecting the positions of the vehicle occupants 90, 92 and 93 inside the host vehicle 10; the obstruction detection step (step S1) of detecting the obstructions 104 to 108 around the periphery of the host vehicle 10; the parking position adjustment step (step S4) of adjusting the parking position 110 within the parking capable frame 103, in accordance with the position of the obstruction 107 existing in the vicinity of the parking capable frame 103; the parking initiation instruction step (step S5) of issuing the instruction to the host vehicle 10 to initiate the automated parking operation in accordance with a predetermined operation; the vehicle control step (step S9) of controlling the host vehicle 10 so as to park in the adjusted parking position 110 in accordance with the parking initiation instruction; and the disembarking guidance step (step S12), wherein, in the disembarking guidance step (step S12), in the case that the obstruction 107 is determined to exist in the vicinity of the parking capable frame 103 in accordance with the parking initiation instruction, then before the host vehicle 10 enters the parking capable frame 103 by the automated parking operation performed in the vehicle control step (step S9), guidance is provided to prompt the vehicle occupants 92 and 93 to disembark at the disembarking position 115 that is based on the adjusted parking position 110, the positions of the vehicle occupants 92 and 93, and the position of the obstruction 107.

In the foregoing manner, during execution of the automated parking operation, in the case that the obstruction 107 exists in the vicinity of the parking capable frame 103, then before the host vehicle 10 enters the parking capable frame 103, guidance (disembarking guidance) is provided to the vehicle occupants 92 and 93 in order to prompt them to disembark at the disembarking position 115 where disembarking is possible in consideration of the obstruction 107 and the positions of the vehicle occupants 92 and 93. For this reason, prior to completion of parking in the parking capable frame 103, a proposal (notification) is issued to the vehicle occupants 92 and 93, so that they may disembark from the vehicle under an environment (disembarking position 115) where disembarking is easy without having to worry about the obstruction 107. As a result, even if the obstruction 107 exists within the parking capable frame 103, the vehicle occupants 92 and 93 can easily disembark.

The present invention is not limited to the above-described embodiments, but it goes without saying that various additional or alternative configurations could be adopted therein based on the content disclosed in the present specification.

What is claimed is:

1. An automated parking device that detects a parking capable frame around a periphery of a host vehicle, and causes the host vehicle to be automatically parked in the detected parking capable frame, the automated parking device comprising:
    a vehicle occupant detection unit configured to detect positions of vehicle occupants inside the host vehicle;
    an obstruction detection unit configured to detect an obstruction around the periphery of the host vehicle;
    a parking position adjustment unit configured to adjust a parking position within the parking capable frame, in accordance with a position of the obstruction existing in a vicinity of the parking capable frame;
    a parking initiation instruction unit configured to issue an instruction to the host vehicle to initiate an automated parking operation in accordance with a predetermined operation;
    a vehicle control unit configured to control the host vehicle so as to park in the adjusted parking position in accordance with the parking initiation instruction; and
    a disembarking guidance unit,
    wherein, in a case that the obstruction is determined to exist in the vicinity of the parking capable frame in accordance with the parking initiation instruction, then before the host vehicle enters the parking capable frame by the automated parking operation performed by the vehicle control unit, the disembarking guidance unit provides guidance to prompt the vehicle occupants to disembark at a disembarking position that is based on the adjusted parking position, the positions of the vehicle occupants, and the position of the obstruction.

2. The automated parking device according to claim 1, wherein:
the vehicle occupant detection unit determines completion of disembarking of the vehicle occupants excluding a driver at the disembarking position that has been guided by the disembarking guidance unit; and
the vehicle control unit controls the host vehicle so as to park in the adjusted parking position in response to a determination result of the completion of disembarking.

3. The automated parking device according to claim 1, wherein, in a case that a plurality of vehicle occupants are objects intended to disembark at the disembarking position, the disembarking guidance unit provides guidance to prompt all the vehicle occupants to disembark at a position where disembarking of all the vehicle occupants is possible.

4. The automated parking device according to claim 3, wherein the disembarking guidance unit communicates with the vehicle control unit so as to control the host vehicle to park in the adjusted parking position, after a predetermined time period has elapsed from providing the disembarking guidance, regardless of whether or not all the vehicle occupants who are the objects intended to disembark have disembarked at the disembarking position.

5. The automated parking device according to claim 3, wherein, even in a case that all the vehicle occupants who are the objects intended to disembark have not disembarked at the disembarking position, the vehicle control unit resumes the control of the host vehicle so as to park in the adjusted parking position when the parking initiation instruction unit is operated again.

6. The automated parking device according to claim 1, wherein the vehicle control unit causes the host vehicle to stop at the disembarking position where the guidance to prompt the vehicle occupants to disembark is provided by the disembarking guidance unit.

7. The automated parking device according to claim 6, wherein, when operation of the parking initiation instruction is detected again after the disembarking guidance has been provided by the disembarking guidance unit, the vehicle control unit resumes the automated parking operation.

8. The automated parking device according to claim 1, wherein, when the disembarking guidance is provided by the disembarking guidance unit, the vehicle control unit unlocks a predetermined door so as to enable the vehicle occupants to disembark at the disembarking position.

9. The automated parking device according to claim 1, wherein, in a case that a driver has difficulty in disembarking due to presence of the obstruction when parked at the adjusted parking position, then when operation of the parking initiation instruction unit is detected again, the vehicle control unit sets, through the parking position adjustment unit, another parking position within the parking capable frame where the driver is allowed to easily disembark, and control the host vehicle so as to park in the other parking position.

10. The automated parking device according to claim 3, wherein, in a case of parking in reverse, the guidance to prompt all the vehicle occupants to disembark at the position where disembarking of all the vehicle occupants is possible is provided at a position where the host vehicle performs turnabout from forward traveling to traveling in reverse.

11. An automated parking method for detecting a parking capable frame around a periphery of a host vehicle, and causing the host vehicle to be automatically parked in the detected parking capable frame, the automated parking method comprising:
a vehicle occupant detection step of detecting positions of vehicle occupants inside the host vehicle;
an obstruction detection step of detecting an obstruction around the periphery of the host vehicle;
a parking position adjustment step of adjusting a parking position within the parking capable frame, in accordance with a position of the obstruction existing in a vicinity of the parking capable frame;
a parking initiation instruction step of issuing an instruction to the host vehicle to initiate an automated parking operation in accordance with a predetermined operation;
a vehicle control step of controlling the host vehicle so as to park in the adjusted parking position in accordance with the parking initiation instruction; and
a disembarking guidance step,
wherein, in the disembarking guidance step, in a case that the obstruction is determined to exist in the vicinity of the parking capable frame in accordance with the parking initiation instruction, then before the host vehicle enters the parking capable frame by the automated parking operation performed in the vehicle control step, guidance is provided to prompt the vehicle occupants to disembark at a disembarking position that is based on the adjusted parking position, the positions of the vehicle occupants, and the position of the obstruction.

* * * * *